United States Patent
Rossler (10) Patent No.: US 10,705,950 B2
(45) Date of Patent: Jul. 7, 2020

(54) METHOD AND SYSTEM FOR SEMI-AUTOMATIC TESTING OF PROGRAM CODE FOR GRAPHICAL USER INTERFACES

(71) Applicant: Retest GmbH, Karlsruhe (DE)

(72) Inventor: Sebastian Jeremias Rossler, Ottersheim (DE)

(73) Assignee: RETEST GMBH, Karlsruhe (DE)

( * ) Notice: Subject to any disclaimer, the term of this patent is extended or adjusted under 35 U.S.C. 154(b) by 85 days.

(21) Appl. No.: 15/868,203

(22) Filed: Jan. 11, 2018

(65) Prior Publication Data
US 2018/0217923 A1  Aug. 2, 2018

Related U.S. Application Data

(60) Provisional application No. 62/452,024, filed on Jan. 30, 2017.

(51) Int. Cl.
  *G06F 11/00*  (2006.01)
  *G06F 11/36*  (2006.01)

(52) U.S. Cl.
  CPC ...... *G06F 11/3692* (2013.01); *G06F 11/3684* (2013.01); *G06F 11/3688* (2013.01); *G06F 11/3696* (2013.01)

(58) Field of Classification Search
  CPC ............ G06F 11/3612; G06F 11/3636; G06F 11/3644; G06F 11/368; G06F 11/3684; G06F 11/3688; G06F 11/3692
  See application file for complete search history.

(56) References Cited

U.S. PATENT DOCUMENTS

| 7,150,002 | B1 * | 12/2006 | Anderson | G06F 11/3664 717/107 |
| 7,739,664 | B2 * | 6/2010 | Bates | G06F 11/3664 717/127 |
| 7,970,596 | B2 * | 6/2011 | Bade | G06F 17/5022 703/13 |
| 8,656,351 | B2 * | 2/2014 | Kodosky | G06F 8/34 717/109 |

(Continued)

FOREIGN PATENT DOCUMENTS

WO    2007118271 A1   10/2007

*Primary Examiner* — Elmira Mehrmanesh
(74) *Attorney, Agent, or Firm* — Volpe and Koenig, P.C.

(57) ABSTRACT

A semi-automatic method for testing program code is disclosed. The method includes executing a program code, and capturing at least one current state of the system under test. The method includes providing a modified version of the program code, thus providing a modified system under test, and executing the modified program code and capturing a modified state of the modified system under test. The method includes comparing the current state of the system under test and the modified state of the modified system under test and detecting changes in the system under test. The method includes displaying at least part of the detected changes to a user and soliciting corresponding user input in terms of applying or discarding the displayed changes. The method includes applying or discarding the detected changes based on the corresponding user input by automatically updating the current state of the system under test.

14 Claims, 10 Drawing Sheets

(56) References Cited

U.S. PATENT DOCUMENTS

| | | | |
|---|---|---|---|
| 8,780,114 B1* | 7/2014 | Jackey | G06F 11/323 |
| | | | 345/440 |
| 9,213,625 B1* | 12/2015 | Schrage | G06F 11/3688 |
| 9,336,127 B2* | 5/2016 | Koneru | G06F 11/3688 |
| 9,342,436 B2* | 5/2016 | Malkin | G06F 11/3636 |
| 9,417,994 B2* | 8/2016 | Ellis | G06F 11/3684 |
| 9,483,387 B1* | 11/2016 | Allocca | G06F 11/3688 |
| 9,619,366 B1* | 4/2017 | Huang | G06F 11/362 |
| 10,146,676 B1* | 12/2018 | Khanduri | G06F 11/3692 |
| 10,176,079 B2* | 1/2019 | Isaacs | G06F 11/3664 |
| 10,282,274 B2* | 5/2019 | Mola | G06F 11/323 |
| 2004/0081346 A1* | 4/2004 | Louden | G06F 11/277 |
| | | | 382/141 |
| 2009/0217302 A1 | 8/2009 | Grechanik et al. | |
| 2014/0317602 A1* | 10/2014 | Zuo | G06F 11/362 |
| | | | 717/125 |
| 2015/0234730 A1* | 8/2015 | Puthuff | G06F 11/3636 |
| | | | 717/128 |
| 2015/0286556 A1 | 10/2015 | Ellis et al. | |
| 2017/0123761 A1* | 5/2017 | Childs | G06F 8/33 |
| 2018/0107585 A1* | 4/2018 | Ramesh | G06F 11/3664 |

* cited by examiner

Column 3 . Column 2, Column 2 - Column 3
In Line 3, Column 2: Meyer-Müller

METHOD AND SYSTEM FOR SEMI-AUTOMATIC TESTING OF PROGRAM CODE FOR GRAPHICAL USER INTERFACES

INCORPORATION BY REFERENCE

The following documents are incorporated herein by reference as if fully set forth: U.S. Provisional Application No. 62/452,024, filed Jan. 30, 2017.

BACKGROUND

The invention relates to a semi-automatic method for testing program code, in particular graphical user interfaces (GUI), by means of a dedicated software tool, the program code defining a system under test (SUT) with a plurality of components and respective attributes.

The invention also relates to a software code for providing, when executed on a suitable computer device, a semi-automatic method for testing program code, in particular graphical user interfaces, by means of a dedicated software tool, which interacts with said program code during execution thereof.

The invention further relates to a testing system for semi-automatic testing of program code, in particular graphical user interfaces, by means of a dedicated software tool, the system further comprising a suitable computer device for executing said software code, said program code and a modified version of said program code.

The state of the art on automated graphical user interface (GUI) testing has two flavors: capture/replay and direct scripting in various forms and frameworks. Since the result of capturing is usually a script which then is replayed, both approaches essentially boil down to the same and are often combined.

The script contains user actions that should be simulated during script execution as a combination of the type of action (e.g. a click) and the action target (e.g. a button), where the target is identified from all available components using one or several of various identification criteria (such as a label, X/Y-coordinates, etc.).

After each action, the script may contain a number of checks or assertions, which are then executed and determine the correctness of the test result. Each of these checks also needs to identify the component the check is executed upon. This major problem is called component recognition or component identification.

The scripting approach has several drawbacks:
  Even if a component is displayed only once on the GUI, it is often used in several tests. A single change to that component often means adapting many test scripts (and both actions and checks).
  Frequent changes to the GUI cause a lot of additional effort to manually maintain the test scripts and lower confidence in the test result—as usually not the SUT is defect, but the test.
  User actions have to be enhanced manually after recording to specify which attributes are used for identification of the target component and checks have to be defined manually to specify the expected value of one or several of such attributes. This causes a lot of additional effort.

SUMMARY

It is the object of the present invention to achieve a method for testing program code which requires less manual effort while producing better and more trustworthy test results. It is also an object of the invention to achieve a software code (software tool) as well as a testing system which use the method according to the invention for improved testing of program code.

These objects are achieved by a method, a code, and a system having one or more features of the invention. Advantageous further embodiments of the inventive concept are defined below and in the claims.

According to the invention, a semi-automatic method for testing program code, in particular but not restricted to graphical user interfaces (GUI), by means of a dedicated software tool, the program code defining a system under test with a plurality of components and respective attributes, comprises: a) providing the program code; b) executing the program code, preferably involving at least one user generated action, and capturing at least one current state of the system under test, wherein the current state comprises a plurality, preferably all, of the available components and a plurality, preferably all, of the components' attributes; c) providing a modified version of the program code, thus providing a modified system under test; d) executing the modified program code and capturing a modified state of the modified system under test, wherein preferably the at least one user generated action is reproduced by the software tool; e) comparing the current state of the system under test and the modified state of the modified system under test and detecting changes in the system under test, which changes correspond to differences between the current state of the system under test and the modified state of the system under test; f) displaying at least part of the detected changes to a user and soliciting corresponding user input in terms of applying or discarding the displayed changes; and g) applying or discarding the detected changes based on the corresponding user input by automatically updating the current state of the system under test.

In this way, the invention brings forth the following improvements over the pertinent prior art:
  Instead of defining individual targets of (simulated) user actions, the whole current state is captured, including all of the available components and all of their relevant attributes.
  This approach means that no more assertions or checks need to be recorded. Instead of a user-defined expected value, it is simply checked if the SUT displays the same value as during capturing (this is equivalent to checking for consistency rather than for correctness).
  However this approach requires maintaining not only one component and adjusting it after changes of the system under test (SUT), but maintaining a large plurality of components—after each action.
  To remedy this problem, the invention comprises a semi-automated way to maintain the test cases and adjust them to the changes in the SUT: display at least some—preferably all—of the detected changes and let the user decide if he or she wants to apply those changes or discard them. Discarding of change may imply that they stem from an undesired change of the SUT (regression) which in turn implies a need for correcting the SUT (defect found).

In a further embodiment of the method according to the invention at least some of the detected changes are grouped according to predetermined characteristics, and are displayed only once for a given group of changes for approval or discarding by the user, thus further reducing manual effort during testing while increasing its robustness.

According to a second aspect of the invention, there is provided a software code for providing, when executed on a suitable computer device such as a personal computer or other microprocessor based computing device having a non-transitory memory such as a RAM, disk drive, or solid state drive coupled to and communicating with the microprocessor, a semi-automatic method for testing program code, in particular graphical user interfaces, by a dedicated software tool, which interacts with said program code during execution thereof, the method being defined by the steps according to any one of the appended method claims.

According to a third aspect of the invention, there is provided a testing system for semi-automatic testing of program code, in particular graphical user interfaces, by a dedicated software tool, comprising software code according to said second aspect of the invention for providing, when executed on a suitable computer device such as a personal computer or other microprocessor based computing device having a non-transitory memory such as a RAM, disk drive, or solid state drive coupled to and communicating with the microprocessor, said dedicated software tool which interacts with said program code during execution thereof, the system further comprising said suitable computer device for executing said software code, said program code and said modified program code, said computer device further including a graphical display device, such as a monitor or touch screen communicating with the computer, for displaying detected changes to a user, with an input device, such as a keyboard, touchscreen, and/or mouse which also communicates with the microprocessor and memory for obtaining user input in relation with the displayed changes, and said dedicated software tool for applying or discarding the displayed changes by the user based on the user input.

A number of further improvements of the basic inventive concept were developed during practical implementation thereof and will now be described in detail:

According to a further embodiment of the method according to the invention, at least some of the detected changes are grouped by component and are displayed only once for a given component, e.g. a special kind of text field, for approval or discarding by the user, even if said component is present in a plurality of different tests. This may further reduce manual efforts on the part of the user thus enhancing testing efficiency and trustworthiness. It is highly efficient to group changes by component, because, e.g., if a button is shown on the GUI on three occasions, it is likely that an adjustment to the button in one occasion should also be applied to it in the other two occasions so that manual effort during testing may be reduced significantly.

According to yet a further embodiment of the method according to the invention, at least some of the detected changes are grouped by attribute type and are applied to a plurality of components comprising an element with a given attribute type with one corresponding approving user input, which may further reduce manual efforts on the part of the user thus enhancing testing efficiency. A typical example would be a 'text' attribute that is changed from 'Meyer' to 'Muller', which change can be applied at once to a text field, a table cell, a label, a combobox and a menu item. Alternatively, a 'font size' attribute could have changed from 10 to 12, which change can be applied at once to a current state of a large number of components of different types.

According to another embodiment of the method according to the invention, at least some of the detected changes are grouped by component type and are applied to a current state of a plurality of components of a given type with one corresponding approving user input, which may even further reduce manual efforts on the part of the user thus enhancing testing efficiency. A typical example would be an 'enabled' attribute that is changed from 'true' to 'false' and can be applied to a large number of components of type text field. Alternatively, a 'text' attribute could have changed, such that a plurality of different values take on a plurality of respective new values, and can be applied to all components of type 'table cell'. Furthermore, changing the color of several components could be handled this way, too.

According to still another embodiment of the method according to the invention, at least some of the detected changes are grouped by parent and structure and are applied to a current state of a larger number of components or to all components within a given structure for a given parent with one corresponding approving user input, which may reduce manual efforts on the part of the user even more thus enhancing testing efficiency. For instance, UI (user input) elements are structured hierarchically: a window has a menu bar and panels. The menu bar has menus, each of which have menu entries. That way, every UI element has a "parent" except for the window itself, which is the top-level element. In this way, changes within a given window can be automatically applied to every element belonging to (or depending from) said window. Another typical example relates to tables: if multiple cells of a table are changed, one can apply those changes to all cells of the row, the table, or even the overall window comprising said table.

According to an advantageous embodiment of the method according to the invention, at least some of the detected changes are defined as local changes with respect to a corresponding characteristic of a parent component, and are grouped and displayed only once for said parent component for approval or discarding by the user. For instance, X/Y coordinates on a screen could be saved in relation to the parent coordinates, instead of absolute screen values.

According to a further advantageous embodiment of the method according to the invention, at least some of the detected changes are grouped as changes of an internal structure of a given component and displayed as changes of that component only. In other words: if the internal structure of a component is changed, these changes may be shown as a change of that component only, not as a change of all of its child components as well.

The general approach according to the present invention also allows for a much better identification of target components during execution in case of change: one can simply compare all former components with all available components and create a direct one-on-one assignment. In case of changes, this approach is much more robust, as one does not only compare singular information fragments but whole pictures. It is analogous to solving a puzzle: instead of comparing a single piece of an old puzzle to a new puzzle, one can compare all pieces of an old puzzle to all pieces of a new puzzle—if some pieces have changed, it is easier to guess which of the old pieces turned into which of the new pieces. Accordingly, in a preferred further embodiment of the method according to the invention, during re-executing, target components are identified by comparing the components of the system under test with the components of the modified system under test and by creating one-on-one assignments between a component of the system under test and a corresponding component of the modified system under test.

According to a highly preferred further embodiment of the method according to the invention, multiple attributes per component are used for component identification. This is in contrast to prior art approaches, because maintaining several attributes to identify components means an increase in manual effort (the test script needs to be maintained if one of the attributes changes). Therefore the current state-of-the art discourages the usage of more than one attribute to identify a component. The inventive approach, however, allows for a semi-automated maintenance (the user only needs to verify and approve a change, the software tool then applies it automatically to a current state of the SUT). Therefore, in the context of the present invention it is less of a problem to use multiple attributes to identify a single component, which makes component recognition much more robust.

In the context of the present invention, one can also add some additional attributes that are used to identify components. One of those attributes may be called "code location": the program code is instrumented such that upon creation of a component the "location of the creation" in the code as specified by class, method, line number and call stack is recorded and used for component identification. Accordingly, in yet another embodiment of the method according to the invention, identification of components is at least partly based on additional attributes, which additional attributes are generated for a given component during or in connection with executing of the program code upon creation of that given component, which additional attributes may comprise one or more from a group including class, method, line number and call stack. This may comprise a class or method name/type/etc., as defined in the program code; a line number of a program source code as included in a compiled version of the program code by a compiler; a call stack as arising during execution of structured code, where the code in one method calls other methods, which in turn call other methods, leading to a so-called 'call stack' as a multitude of combinations of class, method and line number. A non-limiting (pseudo code) example for this would be: de.package.ClassX.methodA(122) calling de.package.ClassY.methodB(321) calling de.package.ClassZ.methodC (2532), together comprising an excerpt of a call stack.

Some components display date/time or other transient values that change constantly. In order to reduce manual efforts, one may allow the user to decide to ignore these components permanently. Accordingly, in a further embodiment of the method according to the invention, components that display transient values, in particular time and/or date, are excluded from displaying the detected changes, preferably based on a corresponding user input.

Sometimes test cases do not need to change in terms of values that are checked, but instead in terms of the way the SUT behaves (e.g. instead of clicking a button and then filling some fields, the SUT now requires to click the button, confirm a message and then fill the field, or fill the fields in a different order, etc.). In order to allow many test cases to be adjusted at once, the user can create what may be called an "execution hook". The user can specify that in a certain situation—defined by the last executed action, the current state of the SUT and the next to-be executed action—one or several additional actions should be executed instead, which actions are thus being "inserted" into the sequence of user generated actions that is reproduced.

Accordingly, in still a further embodiment of the method according to the invention, prior to execution, an execution hook is specified by a user input, which execution hook is defined by a last executed action of the system under test, by a current state of the system under test and by an action to be executed next by the system under test, this execution hook defining one or more additional actions to be executed next before said action to be executed next, wherein preferably the additional actions are automatically applied to a recorded sequence of actions in similar or identical situations. This approach solves the following problem: Assume there are many tests in which a specific functionality is executed, e.g. 500 different tests. Further assume that the SUT changes in that functionality (e.g. requires an additional confirmation before deleting a data record or completely replacing a key shortcut with a button). Traditionally, this would require the user to manually change all of the tests which would require considerable effort and be error prone. Using the concept explained above, the user only has to define one execution hook that matches that situation, and all of the tests are changed "passively" upon execution.

In analogous fashion, the user may want to specify one or several actions that should be skipped during execution, thus being "removed" from the recorded sequence of user actions. Accordingly, in another embodiment of the method according to the invention, prior to execution, an execution hook is specified by a user input, which execution hook is defined by a last executed action of the system under test, by a current state of the system under test and by a plurality of actions to be executed next by the system under test, this execution hook defining one or more actions to be removed from said plurality of actions to be executed next, wherein preferably the actions to be removed are automatically removed from a recorded sequence of actions in similar or identical situations.

BRIEF DESCRIPTION OF THE DRAWINGS

Further characteristics and advantages will now be described with respect to exemplary embodiments depicted in the appended drawing figures. Additional information concerning possible embodiments of the invention can be gathered from a White Paper on "Fully-Automated Regression Testing" authored by the applicant (and available at info@retest.de), which is incorporated herein by reference as if fully set forth.

DETAILED DESCRIPTION

Figure 1:
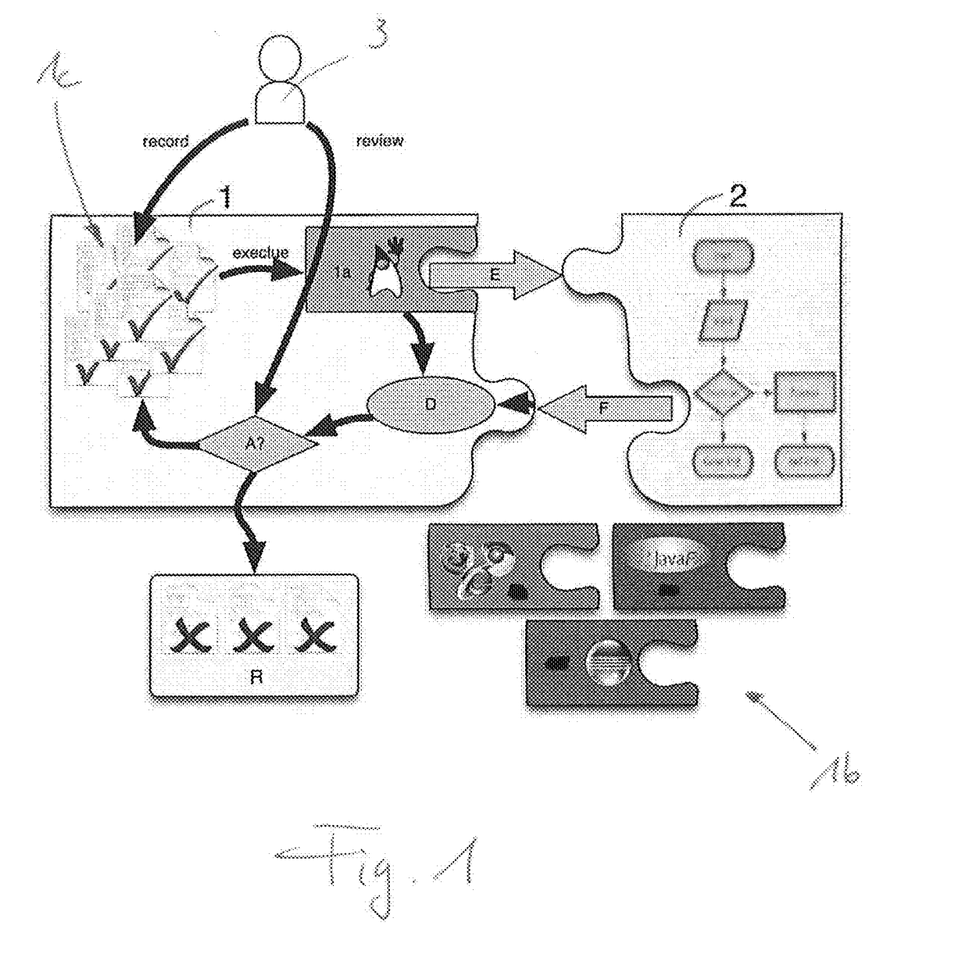
FIG. 1 shows a schematic overview of the software code according to the invention in interaction with a system under test.

FIG. 1 is a schematic overview of the software code according to the invention in interaction with a system under test. Said software code is schematically shown at reference numeral 1 in its executed form, i.e. in the form of a dedicated software tool named "ReTest" in FIG. 1. Reference numeral 2 denotes a system under test (SUT) based on corresponding program code (not shown). The software tool 1 and the SUT 2 are devised to interact, as schematically illustrated by the jigsaw-type puzzle pieces, thus defining a testing system for semi-automatic testing of program code, in particular but not limited to graphical user interfaces, by said dedicated software tool 1.

The software tool 1 comprises an interface module 1a for interaction with SUT 2, which interface module 1a is—without limitation—adapted for the Swing GUI technology. Optional alternative interface modules 1b comprise—without limitation—web interfaces ("Web"), Java FX and SWT. Via said interface module 1a, software tool 1 controls execution (arrow E) of SUT 2 by tests (test scripts) 1c, which SUT 2 then sends back feedback information (arrow F) to software tool 1. Governed by software tool 1 and the software code embodied therein, a number of processes are then carried out based on said back feedback information F: the information is first checked for differences between a previous state of SUT 2 and a current state thereof at reference numeral D. This difference D is then evaluated a reference numeral A in terms of whether or not the detected differences should be applied to tests 1c. Depending on a result of this evaluation, a regression is detected at reference numeral R, or the result is used to modify future tests, which are represented as test scripts or recorded action sequences at reference numeral 1c (cf. above). Basically, regression testing is a type of software testing that verifies that software previously developed and tested still performs correctly even after it was changed or interfaced with other software. One of the main reasons for regression testing is to determine whether a change in one part of the software affects other parts of the software.

User 3 reviews the evaluation at reference numeral A, preferably by viewing them in graphical form on a display (monitor screen; not shown), and controls recording of tests 1c (by means of suitable storing devices; not shown). To this end, user 3 may use any kind of known input device, e.g. a mouse or a touch screen, for generating user input in relation with the displayed changes, and the software tool 1 then applies or discards the displayed changes based on the user input.

Figure 2:
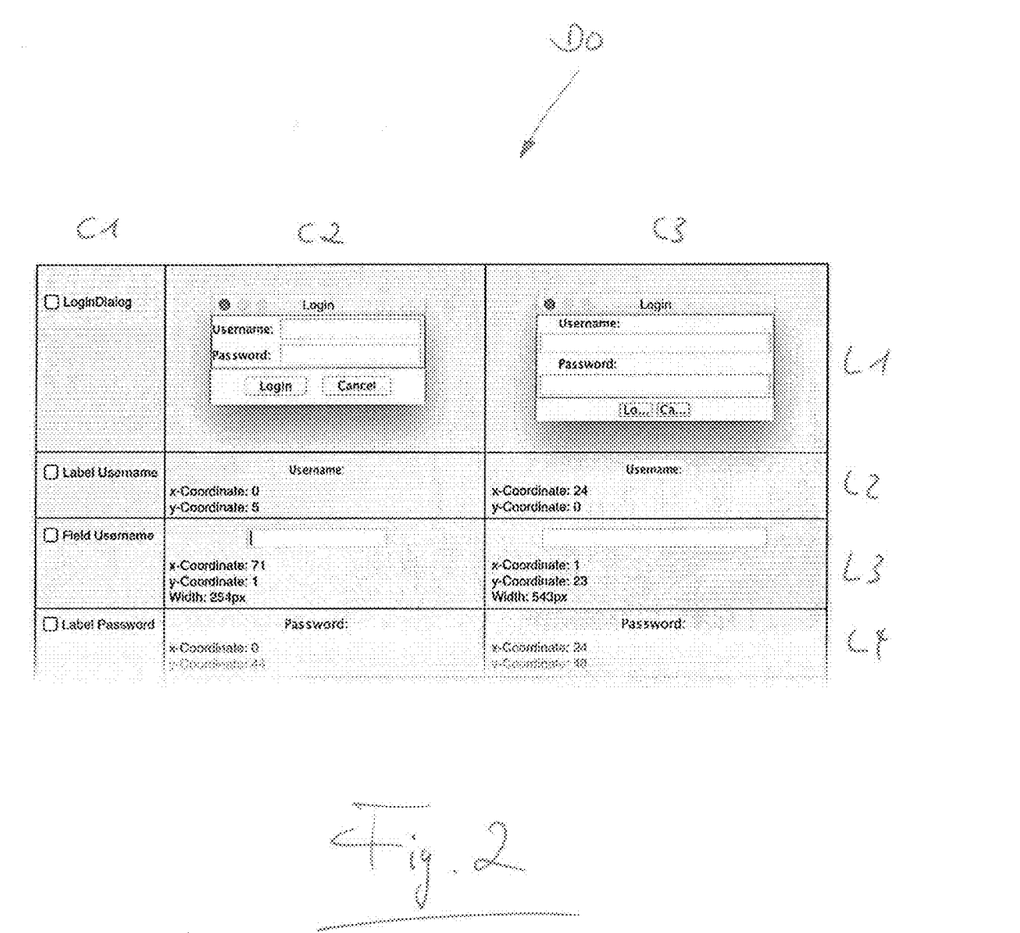
FIG. 2 shows a behavioral Diff between a current state of a system under test and a modified state of the same system.

FIG. 2 shows a so-called behavioral Diff between a current state of a system under test (SUT 2, cf. FIG. 1) and a modified state of that system after some modification to the system under test. The Diff is based on the feedback information F (FIG. 1) gathered by software tool 1 (FIG. 1) as compared to equivalent information gathered during a previous test; it is graphically formatted to allow for easy evaluation by a user, as shown in FIG. 2.

The graphical Diff output, referenced as DO in FIG. 2, comprises—without limitation—three columns denoted C1, C2, and C3, from left to right. Column C1 comprises checkboxes (one per line L1-L4, top to bottom) together with an identifier, e.g. "Label Password" in line L4. Column C2 comprises different components of the system under test in its previous state, and column C3 comprises the same components of the system under test in its current state—one per line L1-L4. For instance, as can be seen from line L2, text label "Username" has changed its location coordinates or location attributes (relative to the "Login Dialog" box shown in line L1) from x=0 and y=5 to x=24 and y=0. By clicking on checkbox "Label Username" in column C1, the user can accept this change, which choice can be applied to other cases in which a corresponding difference has been detected. By thus grouping differences, manual effort can be significantly reduced.

Figure 3:
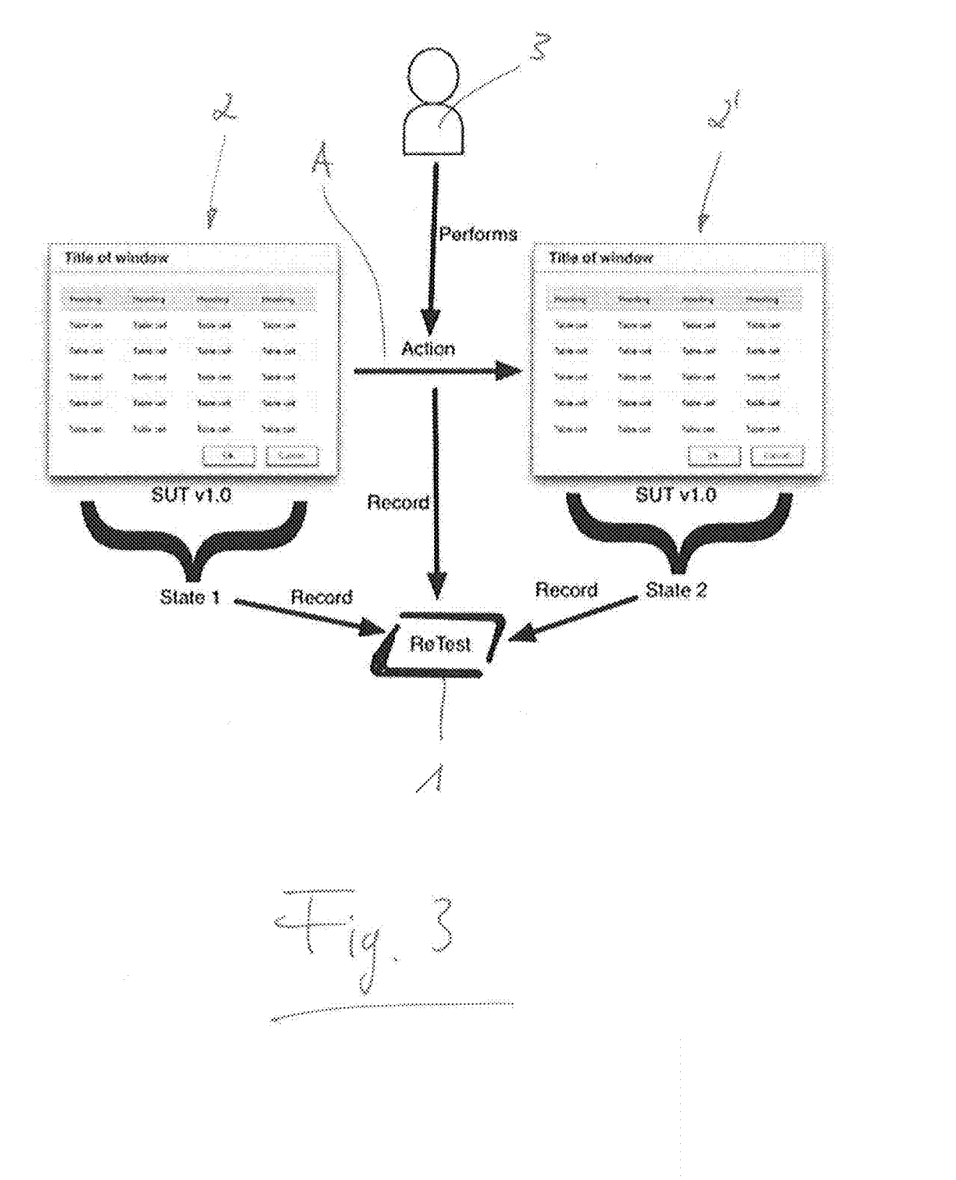
FIG. 3 shows how a user interaction changes the state of the system under test.

FIG. 3 is a schematical representation of how a user interaction changes the state of the system under test from a first State 1 to a subsequent (second) State 2 and how both current states and user action are recorded. The user is depicted at 3. Reference numeral 2 denotes the SUT, as in FIG. 1, in State 1, whereas reference numeral 2' denotes the same SUT but in a different state, i.e. State 2. These states State 1, State 2 are linked by an action performed by user 3. This action is symbolically represented by arrow A. It can be—without limitation—a mouse click or a text input and it entails a change of SUT 2 (State 1) toward SUT 2' (State 2). The action is recorded by software tool 1 ("ReTest"; cf. FIG. 1) together with complete system information describing State 1 and State 2 (arrows denoted "Record") in FIG. 3.

Figure 4:
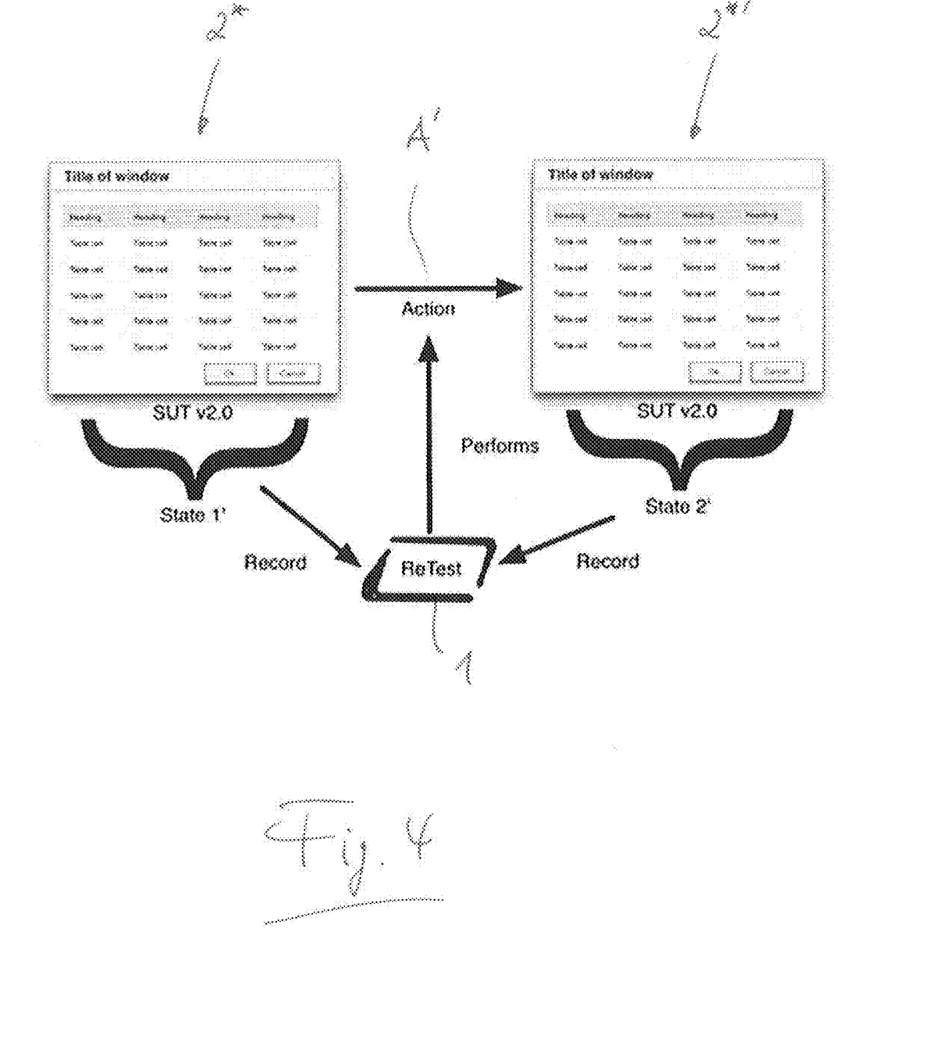
FIG. 4 shows how the user is replaced in the context of an embodiment of the invention.

FIG. 4 is a schematic representation of how the proposed invention, in a particular embodiment thereof, replaces the user in the interaction with the system under test as shown in FIG. 3 and records a modified state of a modified system under test for later comparison with a recorded current state.

In FIG. 4, reference numeral 2* denotes the SUT as shown in FIG. 3, but in a different or modified state (State 1'). In this state, action A' is performed on the system under test, wherein the prime denotes that said action A' is the same as action A in FIG. 3, but performed by software tool 1 instead of a user. Action A' entails a change of SUT 2* (State 1') toward SUT 2*' (State 2'). Complete system state information is recorded by software tool 1 ("ReTest"; cf. FIG. 1) for later comparison, as stated above.

Figure 5:
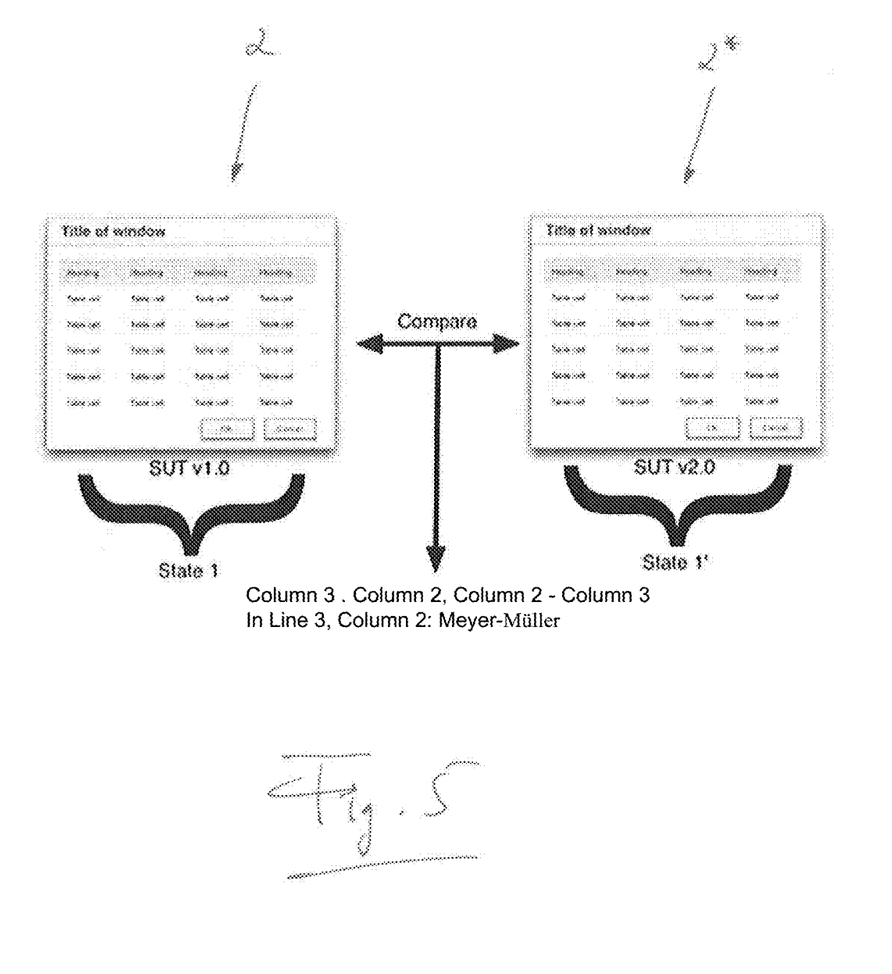
FIG. 5 shows the comparison of a current state of a system under test and a modified state thereof.

FIG. 5 schematically shows the comparison of a current state of a system under test and a modified state thereof together with some resulting differences. The same reference numerals are used to designate the same elements as in FIG. 3 and FIG. 4, respectively. SUT 2 in its respective State 1 is compared to modified SUT 2* in its respective State 1. In the present illustrative case this comparison yields that, in a table, columns 2 and 3 have been interchanged. Furthermore, in a particular table cell a respective value "Meyer" has been changed to read "Müller".

Figure 6:
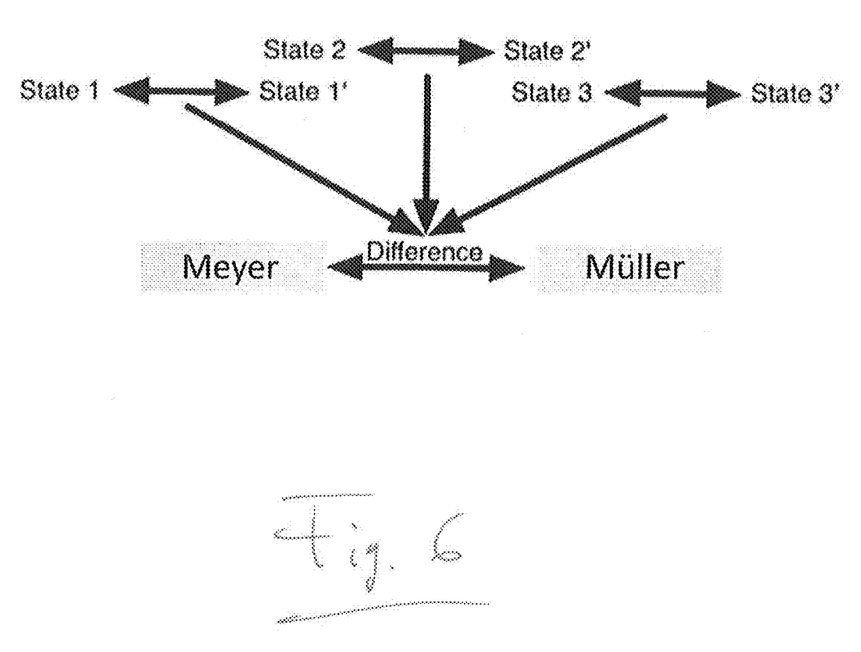
FIG. 6 schematically shows grouping of detected differences.

FIG. 6 schematically shows grouping of detected differences: multiple differences (only one shown—"Meyer" changed to "Müller") resulting from comparison of multiple current states (State 1, State 2, State 3) with modified states (State 1', State 2', State 3'—presumably modified by multiple actions) are grouped by component, i.e. a given table cell, and are graphically presented to the user as a single difference to be approved or discarded. This is equivalent to saying that some of the detected changes are grouped by attribute type and are applied to a current state of a plurality of components comprising an element with a given attribute type with one corresponding approving user input. Graphical presentation preferably corresponds to FIG. 2.

Figure 7:
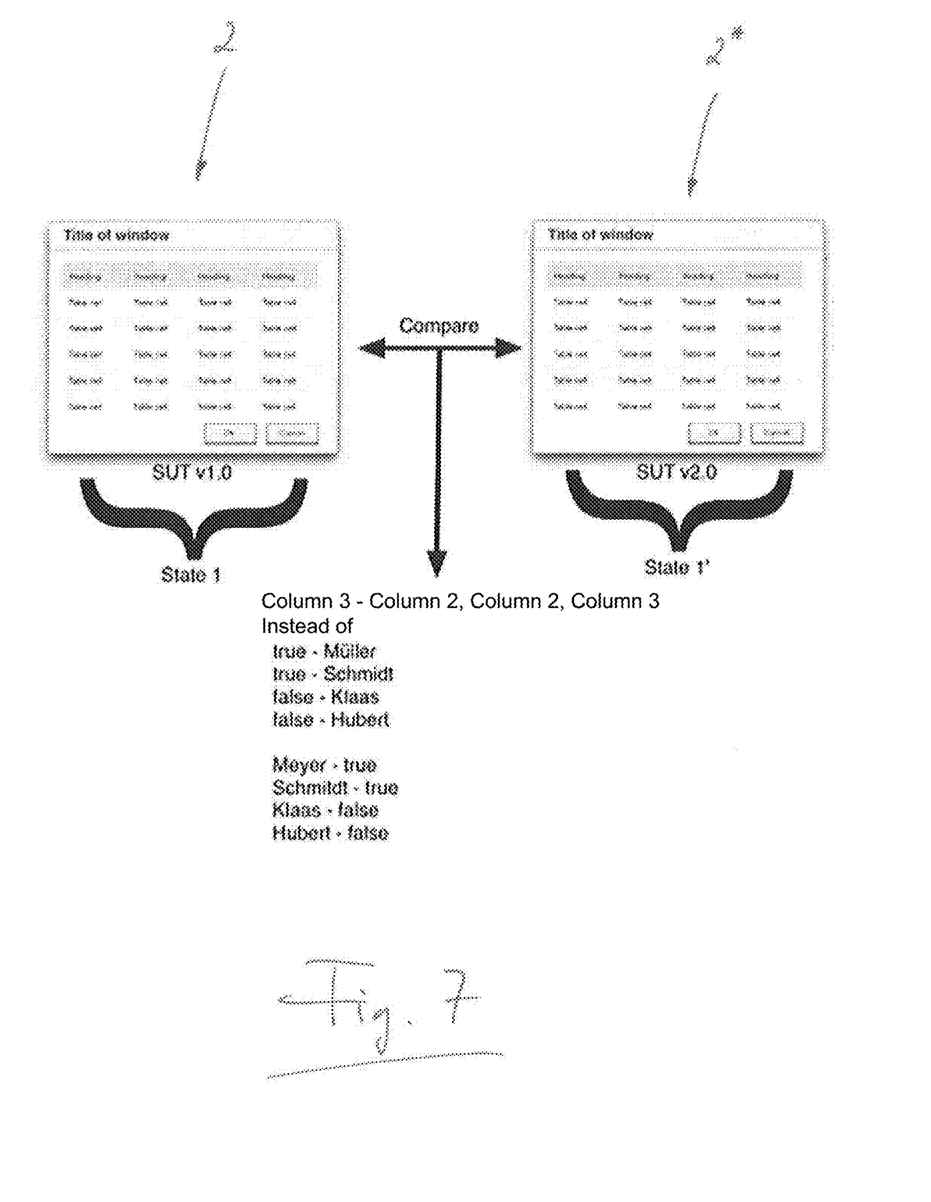
FIG. 7 schematically illustrates the concept of locally containing structural changes.

FIG. 7 schematically shows how structural changes that arise from differences are kept local (locally contained). In this particular example, which is analogous to the situation in FIG. 5 as far as the SUTs 2, 2* are concerned, two columns of a table are switched. In a straightforward implementation of the inventive concept this would result in a great number of detected (and displayed) differences: text values "true" and "false" being replaced by the corresponding text values of the other column in the same row, and vice versa. This would entail considerable manual effort for checking and approving (or discarding) said differences. Instead, in a preferred embodiment thereof the invention recognizes the switching of columns and only presents this "higher level difference" to the user for approval, e.g. with a corresponding checkbox as in FIG. 2. This is equivalent to saying that some of the detected changes are grouped by parent and structure and are applied to a current state of a larger number of components or to all components within a given structure for a given parent with one corresponding approving user input.

Figure 8:
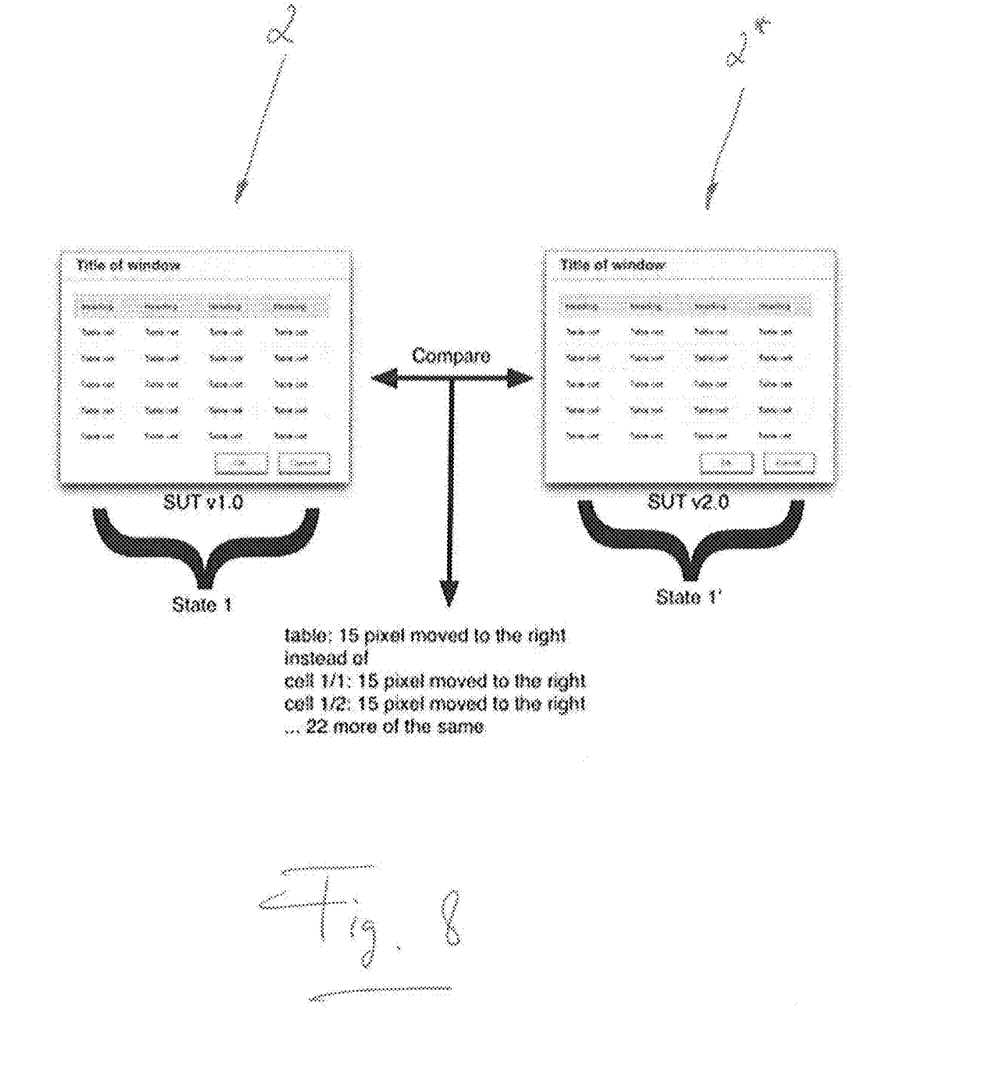
FIG. 8 illustrates a change of a parent not being shown as a change of its child components.

FIG. 8 schematically illustrates that a change of a parent structure, in some embodiments of the invention, is not additionally shown as a change of the affected child components, thus limiting the number of displayed changes and reducing manual effort. In this particular example, which is analogous with the situation in FIG. 5 as far as the SUTs 2, 2* are concerned, a table has been moved to the right by 15 pixels. In a straightforward implementation of the inventive concept this would result in a great number of detected (and displayed) differences: individual table cells moved by said 15 pixels. This would entail considerable manual effort for checking and approving (or discarding) said differences. Instead, in a preferred embodiment thereof the invention recognizes the moving of the whole table and only presents this "higher level difference" to the user for approval, e.g. with a corresponding checkbox as in FIG. 2. This is equivalent to saying that some of the detected changes are defined as local changes with respect to a corresponding characteristic of a parent component, and are grouped and displayed only once for said parent component for approval or discarding by the user.

Figure 9:
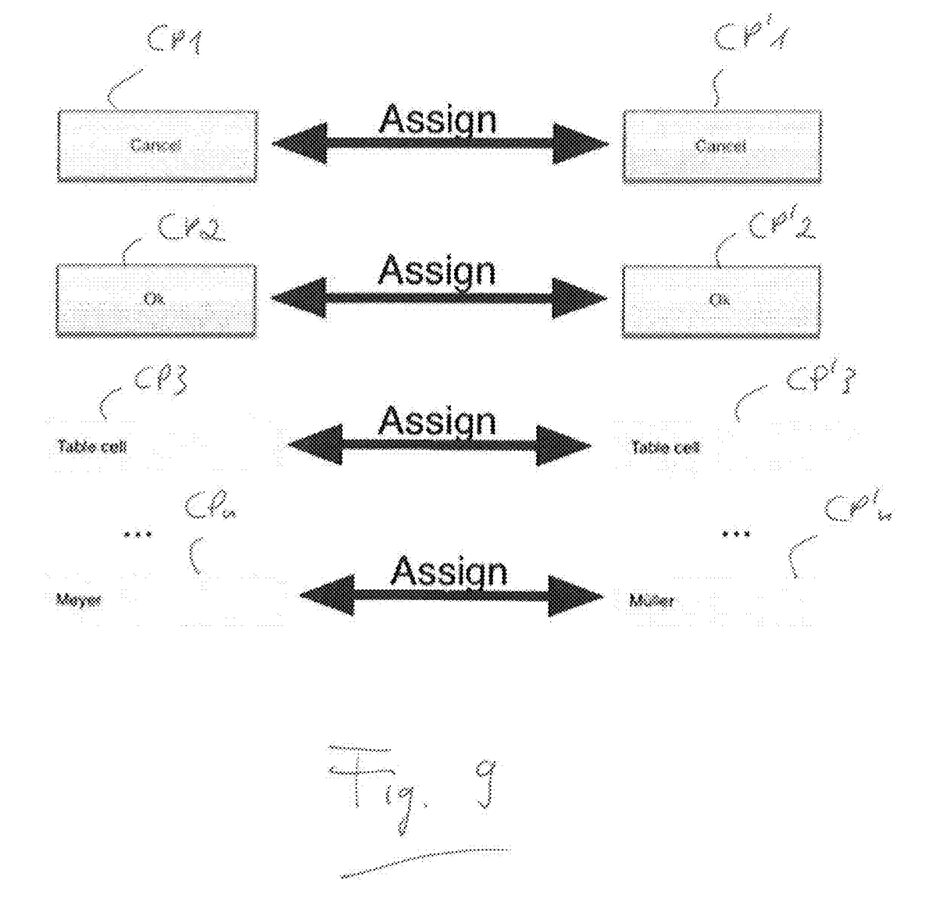
FIG. 9 shows mutual assignment of different components from different states.

FIG. 9 schematically illustrates how different components CP1-CPn from a current state (left) and corresponding components CP'1-CP'n from a modified state (right) of an SUT are assigned to one another like puzzle pieces of two puzzles, which assignment is illustrated by means of double arrows. Improving the reliability of these assignments is one of the results in connection with embodiments of the present invention, and it helps to make testing more efficient and robust. In this way, during re-executing, target components can be identified by comparing the components of a system under test with the components of a modified system under test and by creating one-on-one assignments between a component of the system under test and a corresponding component of the modified system under test.

Figure 10:
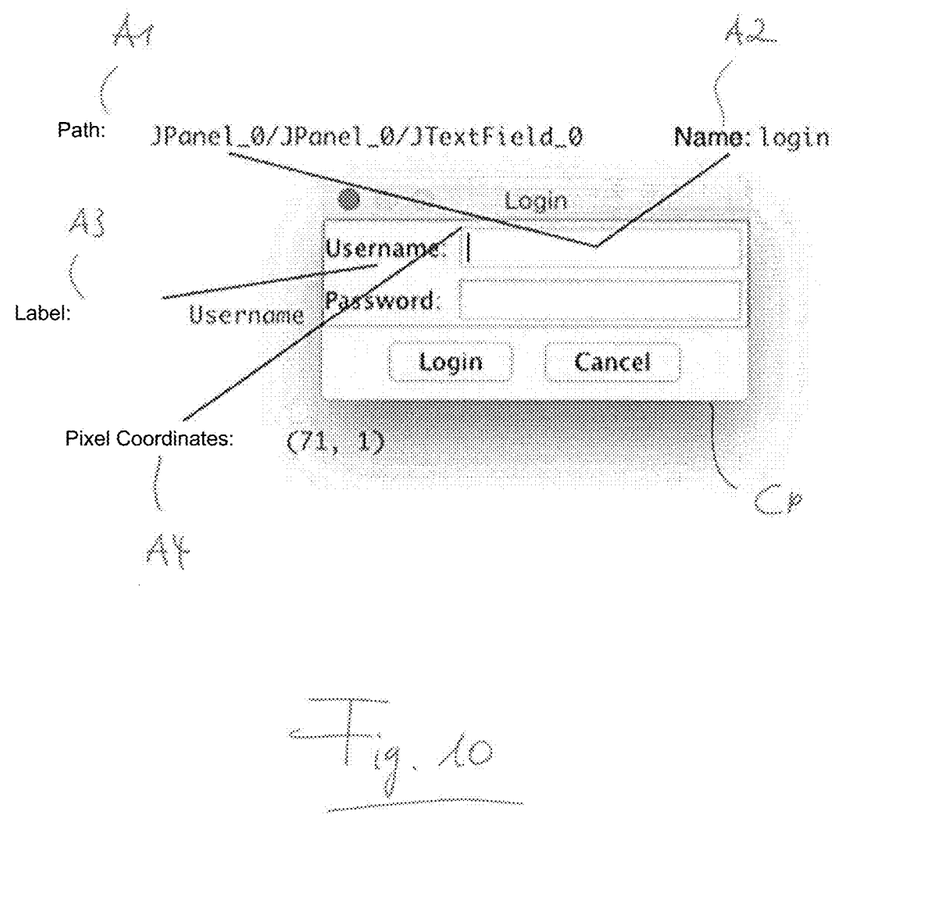
FIG. 10 shows identification of a component using multiple attributes.

FIG. 10 schematically illustrates how a single user interface (UI) component (i.e., a text field) CP can identified by using multiple attributes, as proposed in embodiments of the present invention. Such attributes A1-A4 can be any one or more of 'path' A1 from parent internal name A2, label A3, pixel coordinates A4, etc. In addition (or alternatively) to these attributes, identification of components can be based on additional attributes, which additional attributes are generated for a given component during or in connection with executing of the program code upon creation of that given component, which additional attributes may comprise one or more from a group including class, method, line number and call stack, as detailed farther up.

The invention claimed is:

1. A semi-automatic method for testing program code for graphical user interfaces by a dedicated software tool, the program code defining a system under test with a plurality of components and respective attributes, the method comprising:
   a) providing the program code;
   b) executing the program code on a computer, and capturing at least one current state of the system under test, wherein the current state comprises all available components and all attributes of the components except for components that are specifically not selected;
   c) providing a modified version of the program code, thus providing a modified system under test;
   d) executing the modified program code on the computer and capturing a modified state of the modified system under test;
   e) comparing the current state of the system under test and the modified state of the modified system under test and detecting changes in the system under test, said changes corresponding to differences between the current state of the system under test and the modified state of the system under test;
   f) displaying at least part of the detected changes to a user on a display and soliciting corresponding user input in terms of applying or discarding the displayed changes; and
   g) applying or discarding the detected changes based on a corresponding user input on an input device by automatically updating the current state of the system under test,
   wherein at least some of the detected changes are grouped according to predetermined characteristics, and are displayed only once for a given group of changes for approval or discarding by the user, and
   at least some of the detected changes are grouped by component and are displayed only once for a given component for approval or discarding by the user.

2. The method of claim 1, wherein at least some of the detected changes are grouped by parent and structure and are applied to a current state of a larger number of the components or to all of the components within a given structure for a given parent with one corresponding approving user input.

3. The method of claim 1, wherein at least some of the detected changes are defined as local changes with respect to a corresponding characteristic of a parent one of the components, and are grouped and displayed only once for said parent component for approval or discarding by the user.

4. The method of claim 1, wherein at least some of the detected changes are grouped as changes of an internal structure of a given one of the components and displayed as changes of said component only.

5. The method of claim 1, wherein during step (d), target ones of the components are identified by comparing the components of the system under test with the components of the modified system under test and by creating one-on-one assignments between one of the components of the system under test and a corresponding one of the components of the modified system under test.

6. The method of claim 1, wherein identification of individual ones of the components is carried out based on a plurality of different attributes per each said component.

7. The method of claim 1, wherein identification of the components is at least partly based on additional attributes, which additional attributes are generated for a given one of the components during or in connection with executing of the program code on the computer upon creation of said given component, said additional attributes comprising one or more from a group including class, method, line number, or call stack.

8. The method of claim 1, wherein the components that display transient values are excluded from displaying the detected changes.

9. The method of claim 1, wherein prior to execution, an execution hook is specified by a user input, said execution hook is defined by a last executed action of the system under test, by a current state of the system under test and by an action to be executed next by the system under test, said execution hook defining one or more additional actions to be executed next before said action to be execute d next, and the additional actions are automatically applied to a recorded sequence of actions in similar or identical situations.

10. The method of claim 1, wherein prior to execution, an execution hook is specified by a user input, said execution hook is defined by a last executed action of the system under test, by a current state of the system under test and by a plurality of actions to be executed next by the system under test, said execution hook defining one or more actions to be removed from said plurality of actions to be executed next, wherein the actions to be removed are automatically removed from a recorded sequence of actions in similar or identical situations.

11. A testing system including a processor and a memory, and a software code adapted to be executed by the computer such that the computer is configured to carry out a semi-automatic method for testing program code using a dedicated software tool which interacts with said program code during execution thereof, wherein the testing system is configured to carry out the method of claim 1.

12. The testing system for semi-automatic testing of program code according to claim 11, wherein when the software tool is executed the computer is configured to interact with said program code during execution thereof, said testing system further comprising a graphical display device for displaying detected changes to a user, and an input device for obtaining user input in relation with the displayed detected changes.

13. A semi-automatic method for testing program code for graphical user interfaces by a dedicated software tool, the program code defining a system under test with a plurality of components and respective attributes, the method comprising:
 a) providing the program code;
 b) executing the program code on a computer, and capturing at least one current state of the system under test, wherein the current state comprises all available components and all attributes of the components except for components that are specifically not selected;
 c) providing a modified version of the program code, thus providing a modified system under test;
 d) executing the modified program code on the computer and capturing a modified state of the modified system under test;
 e) comparing the current state of the system under test and the modified state of the modified system under test and detecting changes in the system under test, said changes corresponding to differences between the current state of the system under test and the modified state of the system under test;
 f) displaying at least part of the detected changes to a user on a display and soliciting corresponding user input in terms of applying or discarding the displayed changes; and
 g) applying or discarding the detected changes based on a corresponding user input on an input device by automatically updating the current state of the system under test,
 wherein at least some of the detected changes are grouped according to predetermined characteristics, and are displayed only once for a given group of changes for approval or discarding by the user, and
 wherein at least some of the detected changes are grouped by attribute type and are applied to a current state of a plurality of the components comprising an element with a given attribute type with one corresponding approving user input.

14. A semi-automatic method for testing program code for graphical user interfaces by a dedicated software tool, the program code defining a system under test with a plurality of components and respective attributes, the method comprising:
 a) providing the program code;
 b) executing the program code on a computer, and capturing at least one current state of the system under test, wherein the current state comprises all available components and all attributes of the components except for components that are specifically not selected;
 c) providing a modified version of the program code, thus providing a modified system under test;
 d) executing the modified program code on the computer and capturing a modified state of the modified system under test;
 e) comparing the current state of the system under test and the modified state of the modified system under test and detecting changes in the system under test, said changes corresponding to differences between the current state of the system under test and the modified state of the system under test;
 f) displaying at least part of the detected changes to a user on a display and soliciting corresponding user input in terms of applying or discarding the displayed changes; and
 g) applying or discarding the detected changes based on a corresponding user input on an input device by automatically updating the current state of the system under test,
 wherein at least some of the detected changes are grouped according to predetermined characteristics, and are displayed only once for a given group of changes for approval or discarding by the user, and
 wherein at least some of the detected changes are grouped by component type and are applied to a current state of a plurality of the components of a given type with one corresponding approving user input.

* * * * *